United States Patent [19]
Peroy

[11] 3,721,933
[45] March 20, 1973

[54] DELAYED-OPENING SWITCHES FOR VEHICLES INTERIOR LIGHTING

[75] Inventor: Francois Peroy, Billancourt, France

[73] Assignees: Regie Nationale Des Usines Renault, Billancourt; Automobiles Peugeot, Paris, France

[22] Filed: Aug. 5, 1971

[21] Appl. No.: 169,179

[30] Foreign Application Priority Data

Aug. 18, 1970   France.................................30286

[52] U.S. Cl. .........................337/66, 337/76, 337/78
[51] Int. Cl. ...............................................H01h 71/16
[58] Field of Search..........337/62, 66, 70, 75, 76, 77, 337/78

[56] References Cited

UNITED STATES PATENTS

| | | | |
|---|---|---|---|
| 2,886,670 | 5/1959 | Dillon | 337/66 X |
| 2,513,564 | 7/1950 | Ingwersen | 337/66 X |
| 2,117,232 | 5/1938 | Cohn | 337/75 X |
| 1,939,194 | 12/1933 | Angell | 337/62 |

FOREIGN PATENTS OR APPLICATIONS

| | | | |
|---|---|---|---|
| 1,200,958 | 12/1959 | France | 337/76 |
| 210,941 | 2/1960 | Austria | 337/66 |

*Primary Examiner*—Bernard A. Gilheany
*Assistant Examiner*—A. T. Grimley
*Attorney*—Stevens, Davis, Miller & Mosher

[57] ABSTRACT

This door-jamb switch for controlling the interior lighting of a motor vehicle comprises a pair of bimetallic strips having contact-shaped ends and surrounded by a heating wire; these strips interposed in the lighting circuit through which the heating wire is energized are adapted when cold to retain and when hot to release a metal sliding contact washer constantly urged in the release direction by a spring and retained between said strips by a control rod when the latter is not depressed by the door in its closed position. A metal disk rigid with said rod is adapted to close the supply circuit of said heating wire when the control rod is depressed by the door. This switch introduces a delay-action in the switching-off of the lighting device after completion of the door closing movement.

4 Claims, 1 Drawing Figure

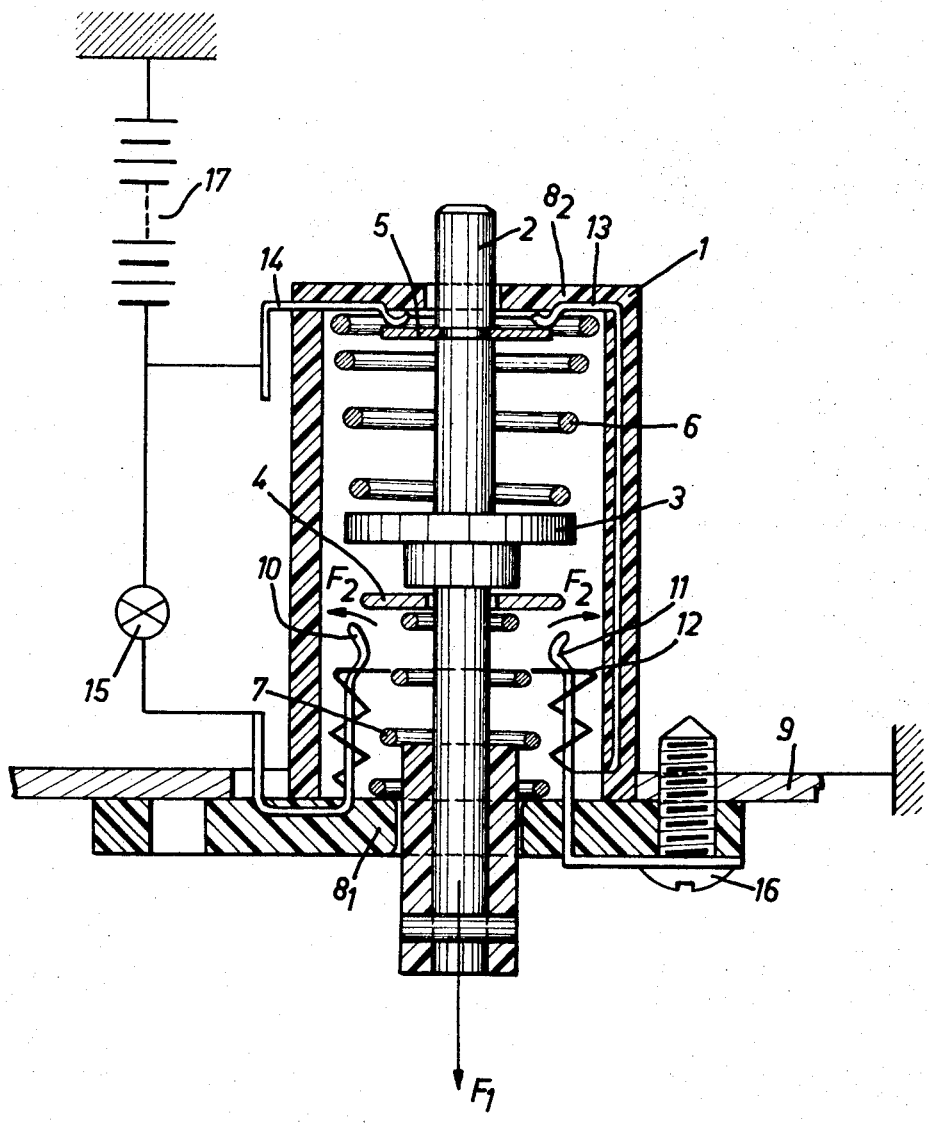

DELAYED-OPENING SWITCHES FOR VEHICLES INTERIOR LIGHTING

The present invention relates to electric switches and has specific reference to a switch interposed in the electric supply circuit of an interior lighting device of an automotive or other vehicle and which is controlled by the movement of a movable panel in a door frame. The door frame and said panel constitute two elements of which one is equipped with said switch comprising a case having a first bottom and a second bottom, and a control rod slidably mounted at right angles to said bottoms, one end of said rod projecting from the first bottom in such a manner that it is adapted to be depressed by the other element when said panel is closed.

It is known to use switches mounted in the fillister of a movable panel of automotive vehicle, such as a door or hood, for energizing one or a plurality of lamps, for example for lighting an interior light in a car when opening a door thereof. With this arrangement it is possible to illuminate the passenger compartment as long as the door remains open, but on the other hand it is necessary to either let the door open or actuate an internal switch if it is required to keep the light on during the time necessary for properly settling oneself in the seat or performing the various maneuvers necessary for starting the vehicle.

In order to avoid this inconvenience and to permit the interior light to be maintained on during the time necessary for enabling the passengers to settle themselves in the vehicle without having to actuate the switch, the present invention provides a door-jamb switch of the quick-closing and delayed-opening type.

This switch is characterized in that is comprises the following component elements:

a metal washer adapted to slide freely along the control rod between first bottom and a shoulder provided on said rod within the case which has said first bottom at one end and a second bottom at the opposite end;

a metal disk rigid with the control rod and electrically insulated from said washer, which is disposed between said second bottom and the shoulder so as to register with a first contact connected to a first terminal of a source of current and with a second contact, whereby the metal disk can bridge said contacts when the rod is depressed during the panel closing movement;

a first compression spring stressed between said second bottom and said shoulder;

a pair of bimetallic strips carried by said first bottom on either side of said rod and having their ends provided with projections facing said rod and formed with input and output ramps for said washer, said projections being adapted to retain said washer when said strips are at room temperature;

a second compression spring, weaker than said first spring and disposed between said first bottom and said washer, so as to urge said washer away from said bimetallic strip projections, and a resistance heating wire forming turns about said bimetallic strips and having one end connected to said second contact and the other end connected to one of said bimetallic strips, the other bimetallic strip is electrically insulated from said heating wire and is connected to the other terminal of said source of current, the lighting device being connected between the first terminal and the bimetallic strip connected to said heating wire, said washer and disk being insulated from said first and second terminals when they are not engaging said contacts and said bimetallic strips.

Of course, the thermo-electrical characteristics of the heating wire and the thermo-mechanical properties of the bimetallic strips are selected as a function of the desired delayed opening, that is, of the delay which it is desired to obtain before opening the contact between the washer and the bimetallic strips.

In order to afford a clearer understanding of this invention, a detailed description of a preferred form of embodiment thereof will now be given by way of example with reference to the accompanying drawing of which the single FIGURE illustrates diagrammatically in axial sections a typical switch of this character.

As illustrated in the drawing, the external protection of the switch consists of a case 1 of insulating material comprising a mounting plate constituting at the same time a first bottom $8_1$, and at the opposite end a second bottom $8_2$.

A control rod 2 formed with an integral shoulder 3 or flange is slidably mounted in axial orifices formed in said bottoms $8_1$ and $8_2$.

A metal washer 4 is adapted to slide freely along the rod 2 between said shoulder 3 and the first bottom $8_1$, and on the other side of shoulder 3 there is provided, between the shoulder 3 and the second bottom $8_2$, a metal disk 5 rigidly connected to the rod through suitable means (not shown).

To ensure a satisfactory operation of the switch, the washer 4 and disk 5 must first be electrically insulated from each other and secondly there must be a positive avoidance of any electrical connection or contact between either said washer or disk and any other electrical circuit or the ground of the vehicle through said rod 2. Therefore, a preferred arrangement consists in making the rod 2 and the shoulder 3 thereof of rigid plastic material. If the rod 2 were made of metallic material, the insulation between the washer and disk could be obtained for example by lining the lower portion (as seen in the drawing) of the rod and the lower face of the shoulder with a suitable insulating material.

A compression spring 6 disposed between the bottom $8_2$ of case 1 and the shoulder 3 constantly urges the rod 2 in the direction of the arrow $F_1$. The force of this spring 6 is greater than that of a second compression spring 7 disposed on the other side of the shoulder 3.

The first bottom $8_1$ carries a pair of bent blades 10 and 11 consisting of bimetallic strips adapted, when heated, to diverge from each other as shown by the arrows $F_2$. The free ends of these strips 10 and 11 are shaped and bent towards and away from the central rod 2 to provide retaining projections with inlet and outlet ramps engageable by the washer 4 normally urged by the spring 7 towards the strip outlet ramps and the shoulder 3.

Coiled about these bimetallic strips and electrically insulated from one strip 11 is a resistance wire 12. This resistor is connected at one end to one contact 13 of a pair of contacts 13, 14 co-acting with the metal disk 5 adjacent the other bottom $8_2$, and at the other end to the bimetallic strip 10.

Contact 14 is connected to the positive terminal of a source of current 17 having a grounded negative terminal, as shown.

Under these conditions, it is clear that the end of spring 6 bearing against the bottom 8₂ is insulated from contacts 13 and 14 by suitable means (not shown), for instance an insulating washer interposed between the spring 6 and the bottom 8₂, and radial ribs moulded integrally with this bottom.

The bimetallic strip 10 is connected to the electric lighting device 15 (such as an interior light, ignition-switch illuminating light, etc...) and the other bimetallic strip 11 is grounded through a screw 16 provided for securing the switch proper to the sheet metal wall 9 of a body element of the vehicle.

If this body element is part of a door jamb or frame, for example, and if the end of rod 2 which projects from the bottom 8₁ lies in the path of a corresponding door (not shown) at the end of the closing movement thereof, when the door is fully closed it depresses the rod 2, thus causing the metal disk 5 to engage the pair of contacts 13 and 14 while compressing spring 6. In this inoperative switch position the other spring 7 urges the metal washer 4 against the shoulder 3 and the circuit between the bimetallic strips 10 and 11 is open, so that the lamp or lamps 15 are put out and resistor 12 is de-energized.

In the "open door" position the spring 6 (which as already explained is stronger than spring 7) reacts against the shoulder 3 to push the rod 2 in the direction of the arrow F₁.

As a consequence of this action, the metal washer 4 is inserted between the bimetallic strips 10 and 11, thus closing the circuit and lighting the lamp or lamps 15. On the hand, as the rod 2 carried along the disk 5 during its travel, the circuit of resistor 12 is open.

When the door is closed again, the rod 2 is pushed, thus compressing spring 6, and the disk 5 bridges the contacts 13 and 14, while the washer 4 is retained between the bimetallic strips 10 and 11. Under these conditions, the lamps 15 remain lighted, as the disk 5 is still bridging the circuit of contacts 13 and 14, and resistor 12 is energized via circuit elements 17, 14, 5, 13, 12, 10, 4, 11, 16 and ground 9. Thus, the resistor 12 will gradually heat the bimetallic strips 10 and 11 and the distortion of these strips in the direction of the arrows F₂ eventually releases the washer 4 so that the spring 7 will urge same against the shoulder 3 and thus open the circuit between the bimetallic strips 10 and 11, the assembly resuming its initial inoperative position.

It will be noted that the resistor 12 is energized only after the door closing movement. Therefore, the heating time of bimetallic strips 10 and 11 begins only at that time and the interior lights or other means (for example a lamp illuminating the ignition switch key hole) remain energized although the door was closed, until the distortion of strips 10 and 11 is sufficient to release the metal washer 4. The delay time thus obtained begins when the door is actually closed and ends when the lights are put off. It is preadjusted by construction of the switch, i.e., by properly selecting the characteristics of the heating wires and bimetallic strips.

Of course, the invention should not be construed as being strictly limited by the specific form of embodiment shown and described herein, since various modifications and variations may be brought thereto without departing from the spirit and scope of the invention as set forth in the appended claims.

What is claimed as new is:

1. Switch interposed in the electric supply circuit containing a source of current of an interior lighting device of a vehicle and controlled by the movement of a movable panel in a frame of said vehicle wherein said movable panel and said frame constitute two elements of which one element carries said switch, said switch comprising a case provided with a first bottom and a second bottom, and having slidably mounted therein, at right angles to said bottoms, a control rod of which one end projects from said first bottom in such a manner that it is depressed by the other element at the end of the closing movement of said movable panel, said switch being characterized in that it further comprises
    a metal washer sliding freely on said rod between said first bottom and a shoulder formed on said rod within said case,
    a metal disk rigid with said rod, electrically insulated from said washer, disposed between said second bottom and said shoulder and registering with a first contact connected to a first terminal of a source of current and with a second contact, thereby said disk engages said first and second contacts when said rod is depressed during the panel closing movement,
    a first compression spring stressed between said second bottom and said shoulder,
    a pair of bimetallic strips carried by said first bottom on either side of said rod and having their ends shaped to provide projections directed towards said rod and formed with inlet and outlet ramps for said washer, in order to retain said washer when said bimetallic strips are at room temperature,
    a second compression spring, weaker than said first compression spring, disposed between said first bottom and said washer, and urging said washer away from said projections of said bimetallic strips,
    a resistance heating wire coiled about said bimetallic strips and connected through one end to said second contact which engages with said metal disk rigid with said rod and said heating wire connected through its other end to one of said bimetallic strips which is connected to the interior lighting device, said bimetallic strip which is not connected to said lighting device being electrically insulated from said heating wire and being connected to the second terminal of said source of current, said lighting device being connected between said first terminal and the bimetallic strip connected to said heating wire, said washer and said disk being electrically insulated from said first and second terminals when they are spaced from said contacts and bimetallic strips, respectively.

2. Switch according to claim 1, characterized in that said case consists of insulating material.

3. Switch according to claim 1, characterized in that said control rod and its shoulder consist of plastic material.

4. Switch according to claim 1, characterized in that said heating wire is coiled a round each bimetallic strip, respectively.

* * * * *